United States Patent Office 2,927,113
Patented Mar. 1, 1960

2,927,113

LEUCOVORIN PURIFICATION

Vitangelo D'Amato, Milan, Italy, assignor to Lepetit S.p.A., Milan, Italy

No Drawing. Application October 13, 1958
Serial No. 766,705

Claims priority, application Great Britain
October 14, 1957

1 Claim. (Cl. 260—251.5)

The present invention relates to a new process for the purification of leucovorin.

Leucovorin, tetrahydroformylpteroylglutamic acid, is a known substance which stimulates the growth of *Leuconostoc citrovorum* in synthetic media; for this property it is also known as citrovorum factor. It reverses the action of pteroylglutamic acid antagonists and the toxicity of aminopterin. Although leucovorin is present in several natural products, its isolation is extremely difficult owing to the small amounts existing in nature. Therefore after its structure was elucidated the best method of producing it was the chemical route starting from a closely related compound, pteroylglutamic acid, through hydrogenation and formylation as described e.g. in J. Amer. Chem. Society 74 3247 (1952).

However, owing to its rather complicated structure pteroylglutamic acid cannot be quantitatively converted into leucovorin. The reaction product is usually accompanied by several by-products, which must be eliminated if comparatively pure leucovorin is desired. The structure of the by-products being obviously very similar to leucovorin, the purification requires a particular skill.

As stated above, the chemical methods for preparing leucovorin consist in hydrogenating a mixture of folic acid and formic acid. The hydrogenation and formylation steps are carried out preferably at room temperature in the presence of a catalyst and under anhydrous conditions, since leucovorin as rapidly destroyed in acidic media. The reaction mixture is then stored for several days at room temperature under a nitrogen atmosphere, then it is diluted with alkali and heated at a pH above 11.

This heating in alkaline medium causes the removal of additional undesired formyl groups which entered into the folic acid molecule thus substantially increasing the yield of leucovorin. After neutralization the solution is filtered through magnesol, made acidic to pH about 4 and absorbed on active charcoal (Darco G-60). After elution with ethyl alcohol, ammonia and water, concentration of the eluate and neutralization to pH 7, crude leucovorin is precipitated in the form of the barium salt. By this process a leucovorin bioassaying not more than 40% (on the anhydrous basis) is obtained. The leucovorin contents of the barium salt average 30–40%. The microanalyses of the same samples give results near the theoretical ones, thus hinting at the presence of substances having a very similar structure, but not the same biological activity as leucovorin.

Moreover, the barium salt isolated cannot be used as such for therapeutic purposes, being highly toxic, and is prepared only in order to obtain a better purification of leucovorin. It is then converted into the calcium salt by conventional methods.

We have found that substantially better leucovorin yields could be obtained if the mixture from the hydrogenation and formylation steps could be deprived of its formic acid content and the volumes of the reaction media in the following steps could be maintained reasonably low so as to allow direct precipitation of leucovorin before it is reacted with an alkaline earth metal to form the corresponding salt. For this purpose the mixture from the hydrogenation and formylation steps, according to our process, after having been filtered from the catalyst is heated at 50° C. under a nitrogen atmosphere, then under the same conditions it is evaporated to dryness in vacuo. The residue is suspended in a small amount of water and treated with aqueous alkali metal hydroxide such as sodium hydroxide in portions whilst stirring at room temperature until solution is complete. After adjusting to pH 8.5 by addition of 10% hydrochloric acid the mixture is treated with 4 ml. N NaOH for each gram of starting folic acid, diluted to about four times its volume with water and heated to 90° for 30 minutes under a nitrogen atmosphere. The mixture is then cooled, adjusted to pH 7.5 with 10% HCl, if desired treated with magnesol, filtered again and evaporated to about one fourth its volume under a nitrogen atmosphere. By adjusting to pH 3.5 with 10% HCl the crude leucovorin product precipitates and is collected in vacuo and washed with water. To obtain the pure alkaline earth metal salt, the wet product is suspended in water and a suspension of an alkaline earth metal hydroxide in water is added to give an alkaline reaction to phenolphthalein. The resulting pasty mass is discarded after decantation of the supernatant liquor, which is adjusted to pH 7.5 with 10% HCl, treated with magnesol, filtered, concentrated to about fourth of its volume, and treated with about five volumes of ethyl alcohol. The alkaline earth metal salt of leucovorin separates out and is collected in vacuo, washed with anhydrous ethyl alcohol and dried in vacuo.

It is apparent from this that the therapeutically useful calcium salt may be prepared directly, if desired, without the intermediate formation of the barium salt, formerly prepared only for purification purposes. This is due to the good purity grade of leucovorin precipitated as described above.

The following example is illustrative of the invention.

Example

A mixture of 50 g. of folic acid assaying 92.5% and 400 ml. of 99% formic acid is warmed at 50–52° C. for one hour. The mixture is cooled to 25° C. and 1.5 g. of platinum dioxide, followed by 2.5 g. of ascorbic acid are added. Hydrogen is bubbled in, whereby about 5,200 ml. are absorbed. The catalyst is filtered off and the brown red filtrate is warmed at 50–52° C. for 2 hrs. under a nitrogen stream, then evaporated to dryness in vacuo under the same conditions. The residue is stirred with 200 ml. water, then 5% sodium hydroxide is gradually added to give a permanent alkaline reaction to phenolphthalein. The solution is adjusted to pH 8.5 with 10% hydrochloric acid, 200 ml. of N NaOH are added, the mixture is diluted to a volume of about 2,000 ml. and heated at 90° for 30 minutes under a nitrogen stream. After cooling to about 20° the solution is adjusted to pH 7.5 with 10% HCl, treated with magnesol whilst stirring, filtered and evaporated to about 500 ml. in vacuo at about 50–60° under nitrogen. By adjusting the solution to pH 3.5 with 10% hydrochloric acid a pink precipitate of leucovorin forms, which is collected and thoroughly washed with cold water.

The wet product is suspended in 100 ml. of water and treated with a calcium hydroxide suspension to give an alkaline reaction to phenolphthalein. The supernatant liquor is decanted, adjusted to pH 7.5 with 10% hydrochloric acid, filtered from some resin and again filtered through a magnesol column, washing carefully with water until a sample of the filtrate does not become turbid on addition of ethyl alcohol. The combined filtrate (about 1100–1200 ml.) and washings are diluted with the same volume of ethyl alcohol. The precipitated cream white calcium salt of leucovorin is collected in vacuo, washed with ethyl alcohol and dried in vacuo. Yield 18.0 g. (26.3% of the theoretical amount). The calcium salt shows the following analytical figures. Spectrophotometric assay 81.5%. Water content 14.20% (with 5 molecules of crystallization water).

What I claim is:

In a process for preparing leucovorin by catalytic hydrogenation and formylation of folic acid, the steps which comprise filtering the reaction solution from the hydrogenation catalyst upon completion of the formylation and hydrogenation, heating the solution at 50° C. under a nitrogen atmosphere and then evaporating the solution to dryness.

References Cited in the file of this patent

UNITED STATES PATENTS

| | | |
|---|---|---|
| 2,659,726 | Cosulich | Nov. 17, 1953 |
| 2,741,608 | Shive | Apr. 10, 1956 |

FOREIGN PATENTS

| | | |
|---|---|---|
| 709,574 | Great Britain | May 26, 1935 |
| 733,130 | Great Britain | July 6, 1955 |
| 735,112 | Great Britain | Aug. 17, 1955 |

OTHER REFERENCES

Roth et al.: J. Amer. Chem. Soc., vol. 74 (1952), pp. 3247–51.